Feb. 24, 1970    M. HURWITZ ET AL    3,496,736

SHEET GLASS THICKNESS CONTROL METHOD AND APPARATUS

Filed Nov. 8, 1967    7 Sheets-Sheet 1

INVENTORS
MATHEW HURWITZ
JAMES R. MELCHER

INVENTORS
MATHEW HURWITZ
JAMES R. MELCHER

INVENTORS
MATHEW HURWITZ
JAMES R. MELCHER

INVENTORS
MATHEW HURWITZ
JAMES R. MELCHER

INVENTORS
MATHEW HURWITZ
JAMES R. MELCHER

INVENTORS
MATHEW HURWITZ
JAMES R. MELCHER 3,496,736
SHEET GLASS THICKNESS CONTROL
METHOD AND APPARATUS
Mathew Hurwitz, Auburndale, and James R. Melcher, Waltham, Mass., assignors to PPG Industries, Inc., Pittsburgh, Pa., a corporation of Pennsylvania
Continuation-in-part of application Ser. No. 606,385, Dec. 30, 1966. This application Nov. 8, 1967, Ser. No. 681,529
Int. Cl. C03b 18/02
U.S. Cl. 65—99   14 Claims

ABSTRACT OF THE DISCLOSURE

Float glass is manufactured in thicknesses differing from equilibrium thickness by utilizing magnetohydrodynamic systems which modify the surface contours of the float bath, forming ridges or troughs therein which change the transverse bath contours or which modify the surface contours of the glass and thus the ribbon cross-section.

---

This application is a continuation-in-part application of our copending application, Ser. No. 606,385, filed Dec. 30, 1966, now abandoned.

This invention relates to the manufacture of flat glass and especially to the manufacture of flat glass on a bath of molten metal, such as tin or tin alloy.

When molten glass is supported on the surface of molten tin and is permitted to flow unhindered, it will assume a thickness, except for relatively narrow edge portions thereof, known as "equilibrium thickness." In the case of the usual soda-lime-silica glass of plate glass composition, the normal equilibrium thickness on molten tin is 0.270 inch or approximately one-quarter inch. The relatively narrow edge portions of such a ribbon terminate in knife edges to joined to the main portion of the glass by curved surfaces, so that essentially the glass thickness in the edge portions varies from substantially zero at the terminal edges to equilibrium thickness. Such edge portions are generally one-half to one inch in width, i.e., a minor portion of the usual commercial ribbon of glass.

For some applications, the "equilibrium" thickness glass is desired, as for example, in the manufacture of mirrors, store fronts, etc. However, the automotive trade requires glass of thicknesses less than equilibrium. For windshields, two one-eighth inch sheets of glass are laminated to a plastic interlayer. Back lights and side lights are generally tempered and are preferably three-sixteenths inch thick or less. Thicker than equilibrium glass is required for doors, etc. Thus, it is desirable to be able to produce glass in a variety of thicknesses.

Heretofore, when thinner than equilibrium glass has been produced commercially, the glass has been attenuated both laterally and longitudinally. Lateral attenuation lessens the reduction in width when the ribbon is stretched. Because of unequal temperature conditions within the glass itself, attenuation is not the most desirable method for producing thinner than equilibrium glass because variations in thickness, both transverse to and along the length of the ribbon will occur.

Another method for producing glass of different than equilibrium thickness has been proposed. In this method, as disclosed in U.S. Patent No. 3,241,939, a fluid pressure is applied to the glass inwardly of its edges which is different from the pressure on the supporting bath at the edges of the glass. If the pressure on the glass inwardly of the edges is greater than that on the supporting bath at the edges of the glass, the glass formed is less than equilibrium thickness. If the reverse is true, the glass thickness is greater than equilibrium thickness.

It has also been found that when molten glass is deposited on a molten metal support having different levels, glass can be produced with central portions of a thickness or thicknesses differing from equilibrium thickness. The central portions may be less or more than equilibrium thickness depending upon the supporting levels of the bath and the manner of operation.

In order to carry out the process just described, it has been proposed to provide multi-level supporting baths by separating the bath mechanically into various longitudinal sections. Means are then provided for adjusting and maintaining the desired levels. Materials used for dividing the bath into sections must be chosen to be non-wetting with the glass, and to be non-reactive with the glass, the metal of the bath and the atmosphere above the bath.

In all of the processes just described, the edge portions of the glass assume the particular, previously described, configuration, i.e., a knife edge joined by curved surfaces to an essentially flat surface of the main body of the glass.

It is now proposed, in a process of producing flat glass wherein molten glass is supported on a bath of molten metal, to utilize the phenomenon that the edge portions of the glass will assume equilibrium configuration including knife edge and curved surfaces joined to a marginal, equilibrium thickness portion of the main body of glass regardless of the thickness of the central portion of the glass to produce various thicknesses of glass. Here, according to this invention, a continuous and completely adjustable casting and supporting surface on the metal supporting bath is utilized. In the absence of glass, the supporting surface is essentially bi-level in configuration, although there are no sharp corners or areas of demarcation between levels, the areas of demarcation are somewhat smooth and rounded. When glass is deposited on the support, the glass displaces some of the metal. While the main, central area of the supporting surface is at one level, at least part of the other supporting surface conforms to the edge configuration of the bottom of the glass, so that the free surface of the metal just outside the glass is at a level dictated by the knife edge of the glass. This essentially bi-level bath configuration is accomplished by using those electrical forces known as Lorentz body forces, either DC or AC induced, and polarization and magnetization forces. The systems to be described, may be referred to as magnetohydrodynamic, electrohydrodynamic or combinations thereof.

The magnetohydrodynamic systems rely on those forces which come from the interaction between electrical currents and magnetic fields and a force due to the magnetization of the materials of the glass and bath system. The electrohydrodynamic system utilizes attractive forces which exist between the plates of a charged capacitor and polarization forces.

The DC magnetohydrodynamic technique is to impose those Lorentz body forces and magnetization forces within the tin of the bath to produce depressed troughs or elevated ridges in the bath corresponding to the locations of the thickness-forming regions of the glass. The thickness-forming regions are the laterally spaced edges and edge portions of the glass ribbon. The glass thickness and configuration in the thickness-forming regions is not substantially altered; it corresponds to that of the glass in the equilibrium process, i.e., there are portions of equilibrium thickness joined by curved surfaces terminating in a knife edge. The ribbon thickness inwardly of the edge portions may be decreased to zero or increased by approximately a factor of two by adjusting the depth of troughs or height of ridges, respectively. These DC magnetohydrodynamic systems require contact electrodes in the tin to introduce currents therein and electromagnets or current-carrying bus bars suspended over the thickness-forming regions to furnish the required magnetic field.

In the AC magnetohydrodynamic systems, the resultant of the interaction of the time-varying magnetic fields and AC currents in the tin generates stresses which displace the surface of the tin. In good conductors, such as tin, induced currents can be very large and at ordinary AC frequencies, the currents will concentrate in the region of the magnetic fields inducing them. A current-carrying bus bar positioned over the thickness-forming regions can be used, with or without tin contact electrodes. In AC magnetohydrodynamic high-field core-wound magnets may also be used if desired.

One form of AC magnetohydrodynamic system wherein a bus bar is suspended over the thickness-forming regions is relatively simple, requiring no modification of a conventional float glass producing chamber, "float" glass being descriptive of flat glass produced on a bath of molten tin or the like, or its atmosphere. Further, no mechanical or electrical contact with either glass or tin or active cooling of the bus bar is required in this form of AC system. The temperature rise of a typical bus bar is small. However, if a core-wound element is used, active cooling may be required because of temperature rise. Thickness control of glass inwardly of the edge portions to zero is possible with AC systems.

The electrohydrodynamic system utilizes attractive forces which exist between the plates of a charged capacitor and polarization forces. In this electric field system, an electrode is placed above the surface of a fluid which may be conductive or insulating. When an electric field is applied, the surface of the fluid is attracted upwardly. Both tin and molten glass, which are electrically conductive are affected in this manner.

Two such electrohydrodynamic systems may be envisioned. In the first, an electrode is positioned above the thickness-forming region of the glass; in the second, an electrode is positioned over the entire expanse of the glass ribbon except for the thickness-forming region.

In the first electrohydrodynamic system, wherein electrodes are located over the thickness-forming regions, the tin and that glass beneath the electrodes are attracted upwardly, so that the central portion of the ribbon of glass inwardly of the thickness-forming regions is decreased in thickness, the result of a balance between the force of gravity on a column of fluid and the electric pressure acting on the free surface of the column. The glass in the thickness-forming regions is not substantially altered from that produced by the equilibrium process, i.e., the configuration of the edge portions is the same as in the equilibrium process.

In the second electrohydrodynamic system, wherein the electrode is located over the central region of the glass, the glass beneath the electrode is attracted upwardly while the glass in the thickness-forming regions is substantially unaltered. Thus, the central area of the ribbon is thicker than equilibrium thickness, while the thickness-forming regions remain unchanged and of equilibrium configuration.

In any event, regardless of the particular system above described, the means in the headspace above the metal bath to apply the forces to the metal and glass system is coextensive, at least in length, with the thickness-forming regions of the glass.

To more fully understand this invention, attention is directed to the accompanying drawings in which.

Figure 1:
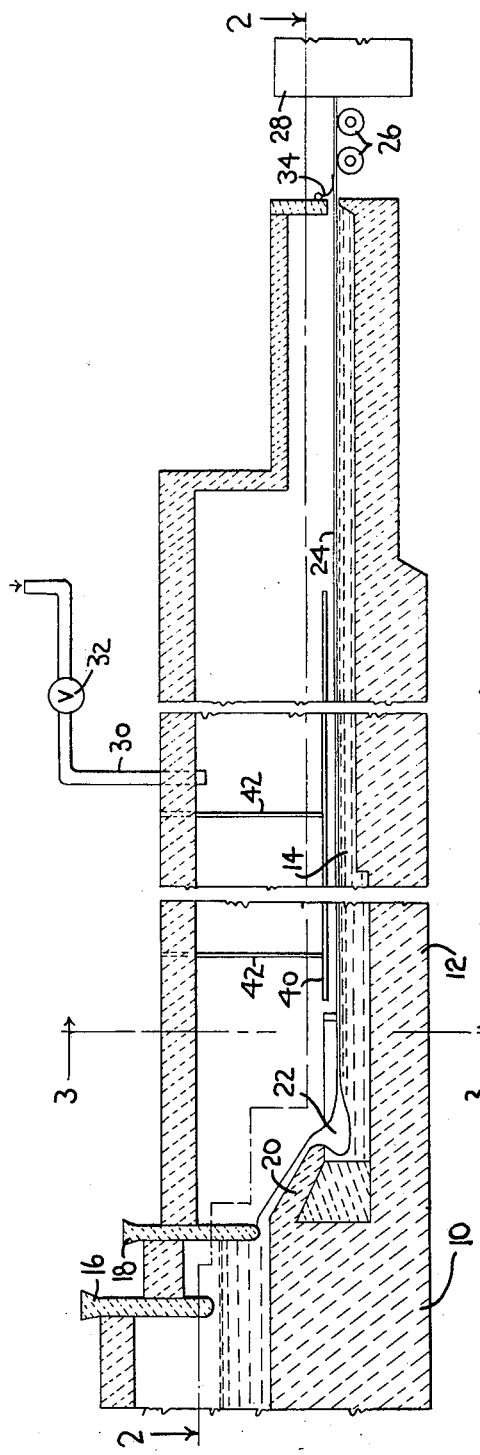
FIG. 1 illustrates, in longitudinal section, a typical float glass-producing apparatus with one form of magnetohydrodynamic apparatus in accordance with this invention installed, therein.
Figure 2:
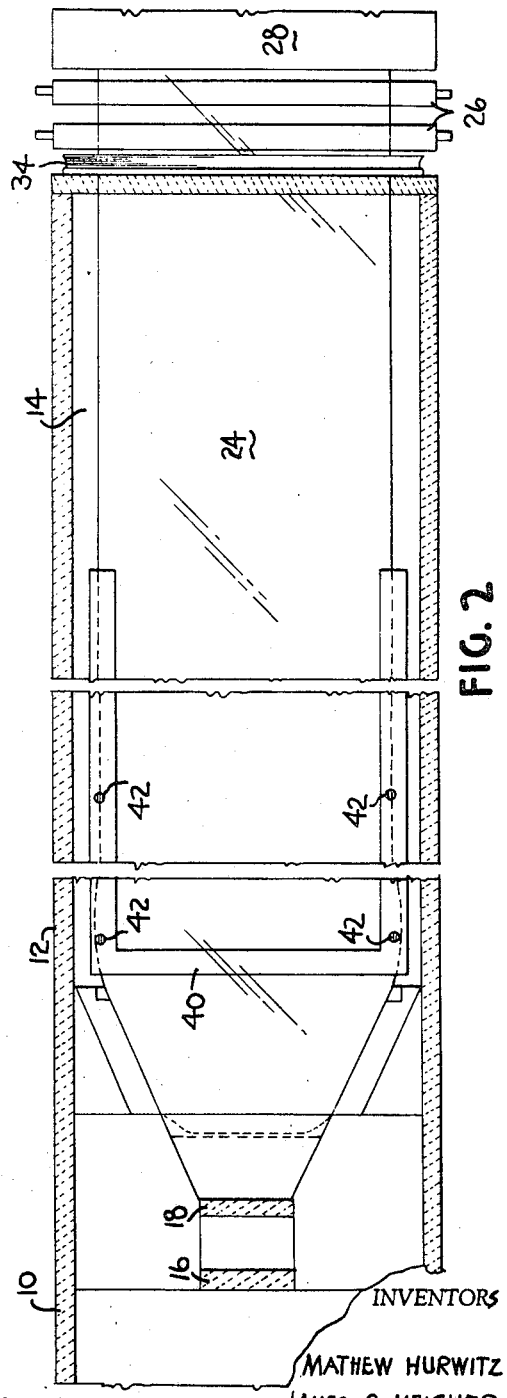
FIG. 2 is a longitudinal section through the apparatus of FIG. 1 taken along line 2—2.
Figure 3:
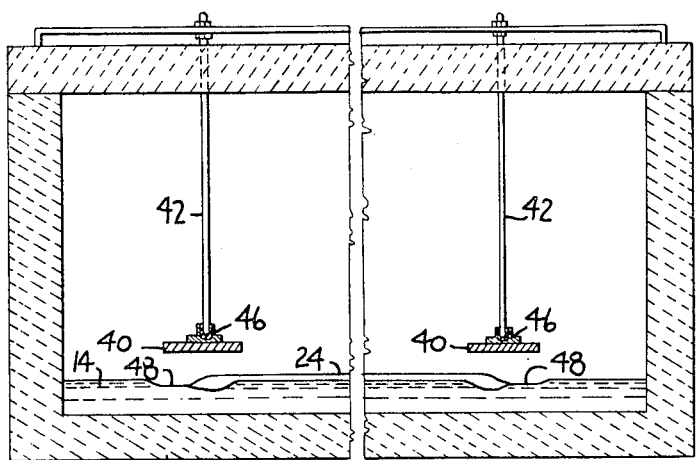
FIG. 3 is a section taken along line 3—3 of FIG. 2.

Attention is now directed to FIGS. 1 to 3 wherein there is illustrated a typical float glass-producing apparatus incorporating one form of this invention which apparatus includes a refractory melting tank 10 from which molten glass is delivered to a refractory float tank 12 and onto a bath of molten tin 14. Tweels 16 and 18 control the discharge of molten glass which flows over a lip 20 onto the bath 14. The molten glass collects as a heel 22 and spreads to form a ribbon 24 on the bath 14. The temperature of the glass is maintained sufficiently high to permit it to level and become smooth on the bath 14, after which the temperature is reduced to permit the formed ribbon 24 to be removed from the tank by takeout rolls 26, located at the exit end of the tank 12, and to be conveyed into an annealing lehr 28 for controlled annealing. Thereafter, the ribbon of glass is cut and packed for shipment or handled in other well-known ways.

To prevent or materially reduce oxidization of the metal of the bath, a non-oxidizing atmosphere is maintained in the headspace above the bath 14. A non-oxidizing gas, such as nitrogen or a mixture of nitrogen and a small percentage of hydrogen is fed into the tank 12 through a conduit 30 through a metering valve 32 from an external source, not shown. Generally the pressure is just slightly above atmospheric to prevent the ingress of ambient atmosphere into the headspace through the exit and any cracks or crevices in the refractory structure. The exit is also sealed by using one or more curtains, such as 34, which contact the glass ribbon.

In the absence of applied forces, the glass deposited on the bath of molten tin will seek its equilibrium thickness, which, as previously explained, in the case of soda-lime-silica glass, is approximately one-fourth inch. Of course to obtain smooth, plane surfaces, the glass must have sufficient dwell or residence time on the tin at temperatures at which it will flow, and must be able to flow laterally unhindered. The rate of removal of the glass from the bath is coordinated such that the glass flowing laterally does not contact the main side walls of the tank 12 as this would disrupt the process. To achieve this coordination when making equilibrium glass, the quantity of glass passing any line normal to the tank walls and across the bath must be equal.

Figure 4:
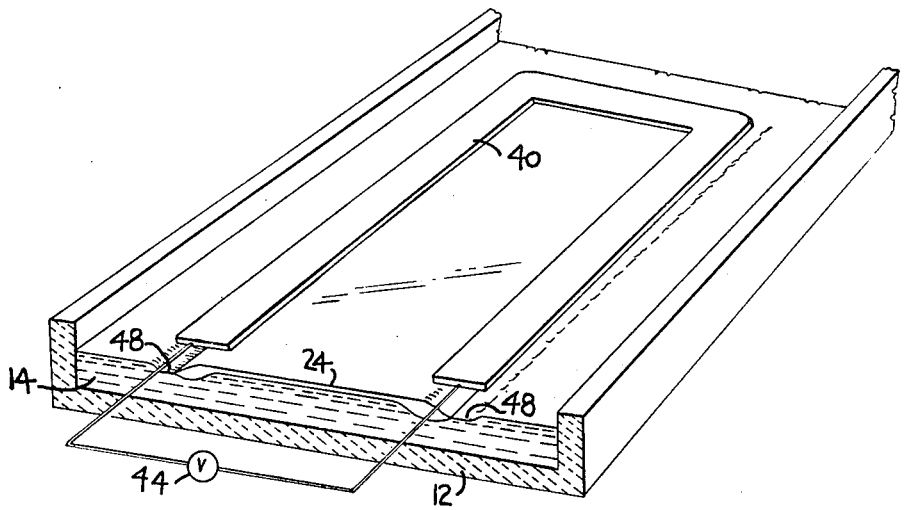
FIGS. 4 and 4A illustrate schematically forms of an AC magnetohydrodynamic system configuration.

In FIGS. 1 to 3 and also FIG. 4 there is illustrated an AC magnetohydrodynamic glass-forming system utilizing induced currents in the tin bath to form troughs spaced in the glass thickness-forming regions and in which a loop bus bar 40 is suspended by refractory rods 42 above the bath 14. The bus bar 40 is connected to a suitable power source 44. The bus bar 40 is insulated from the rods 42 by suitable insulating connectors 46. When current is introduced into the bus bar 40, currents will be induced in the tin immediately below the bus bar and a continuous trough 48 (see FIGS. 3 and 4) will be formed in the tin. The spacing of the longitudinal trough portions is coordinated with the lateral spread of the molten glass, so that the edge portions of the ribbon will lie in the trough. The depth of the trough depends upon either (1) the bus bar current; increasing the bus bar current increases the depth of the trough and vice versa, or (2) the spacing of the bus bar above the tin bath; decreasing the spacing increases the depth of the trough and vice versa. Means can be provided for raising and lowering the bus bar 40 and/or for controlling the current introduced into the bus bar 40. It is to be remembered that the central portion of the ribbon is thinnest when the trough is deepest.

Figure 4A:
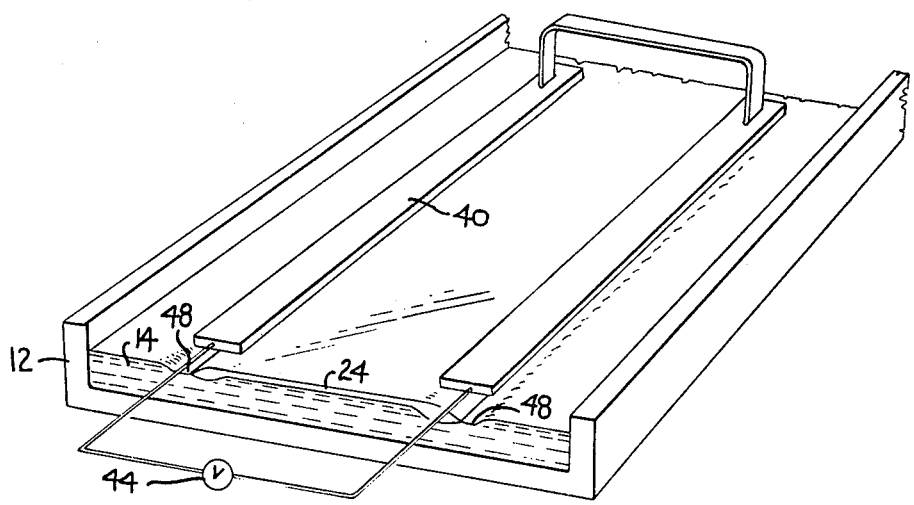

The bus bar 40 is of such length to extend along the forming region to a zone of zero grow-back i.e., to a location where the glass is of such viscosity to retain its dimensions of width and thickness, generally about one-third the length of the bath. The closed ends of the loop 40 may be elevated, so as to cause little or no influence on the tin bath, such as illustrated in FIG. 4A. Because of temperature encountered on the order of 2000° F. the bus bar 40 is preferably constructed of a suitable refractory metal, as for example molybdenum sheathed in an alloy, such as Inconel (a high nickel containing steel alloy). The electrodes are also protected against corrosion by the atmosphere. Inconel itself may be used; however, molybdenum is a better current conductor.

Figure 5:
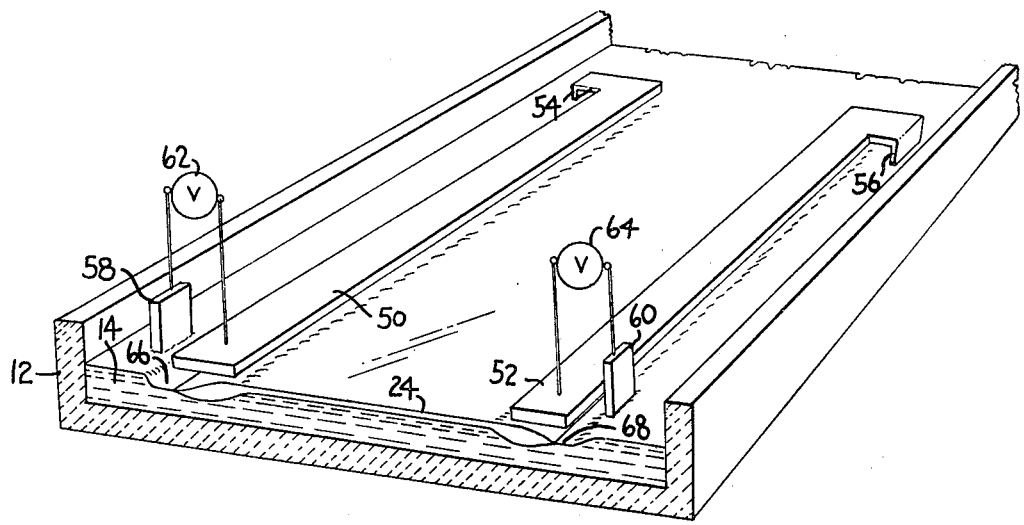
FIG. 5 illustrates schematically another form of an AC magnetohydrodynamic system configuration.

FIG. 5 illustrates another AC magnetohydrodynamic system configuration according to this invention in which currents are conducted into the tin. In the embodiment illustrated by FIG. 5, there are spaced bus bars 50, 52 located above the tin bath 14. Each bus bar 50 or 52 is shown as being L-shaped in plan and the short leg is connected to an electrode 54, or 56 respectively, which extends into the tin. Adjacent the other end of each bus bar are electrodes 58 and 60 extending into the tin. Sources of AC current 62, 64 are connected respectively to the electrode 58 and bus bar 50 and electrode 60 and bus bar 52. Each bus bar electrode may be independent of the other or may be interconnected for concurrent operation. As in the case of the bus bar 40, the spacing of the bus bars is coordinated with the natural width of the glass and the longitudinal length thereof is coordinated with the temperature of the glass. Thus, the electrodes terminate at a location of zero grow-back of the glass. As in the previous example, an increase in current in each bus bar increases the depth of troughs 66, 68 formed in the tin and the spacing of the bus bars from the tin surface influences the depth of the troughs which are formed. Means may be provided for varying the position of the bus bars and/or for controlling the introduced current. In any event, using this embodiment produces a ribbon of glass having a main central part thinner than the normal equilibrium thickness of the glass.

Figure 6:
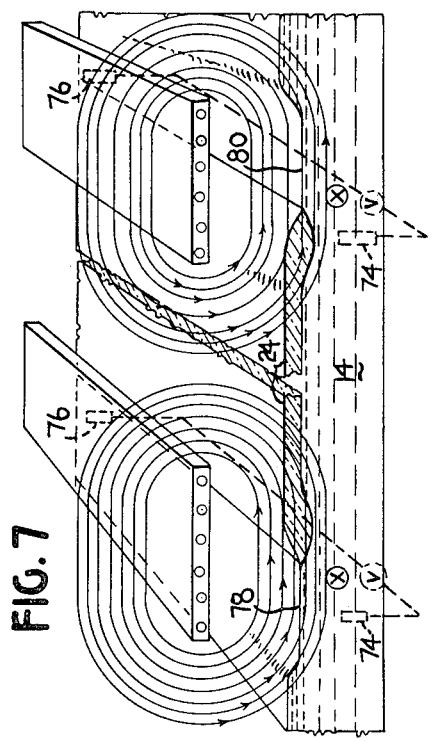
FIG. 6 illustrates schematically one form of a DC magnetohydrodynamic system configuration with its magnetic field being shown.
Figure 7:
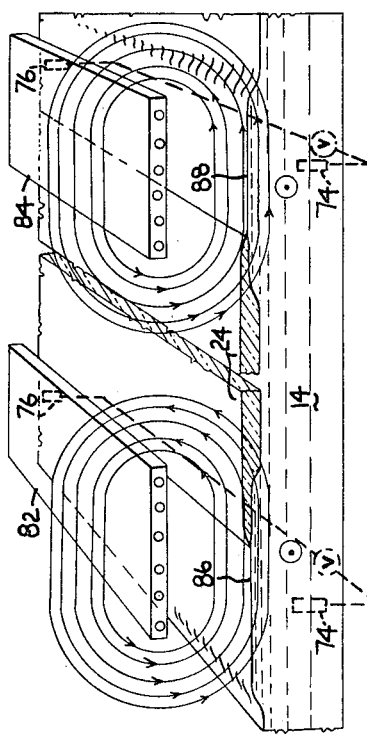
FIGS. 7, 7A, 8, 9 and 9A illustrate other forms of DC magnetohydrodynamic system configurations with the magnetic fields being shown.

FIGS. 6 and 7 illustrate schematically DC magnetohydrodynamic systems using, respectively, core-wound magnets and current-carrying bus bars. In FIG. 6 there are spaced core-wound magnets 70, 72 located over the thickness-forming regions of the tin bath 12 and electrode pairs 74, 76 in the tin. Generally each pair of electrodes is located immediately below the magnets and at the opposite ends thereof. The tin bath acts as a conductor in each case. With the current flowing in the tin in the direction indicated by the appropriate symbols, troughs 78 and 80 are formed in the tin. As in the previous arrangements, the troughs are corrdinated with the glass to be located at the thickness-forming regions.

In FIG. 7, current-carrying bus bars 82 and 84 replace the core-wound magnets, and with the current flowing, as indicated by the appropriate symbols, troughs are formed in the tin.

Figure 8:
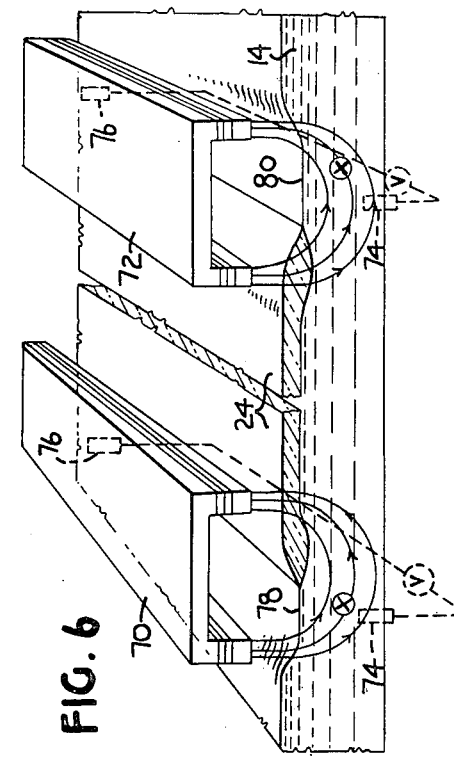
Figure 9:
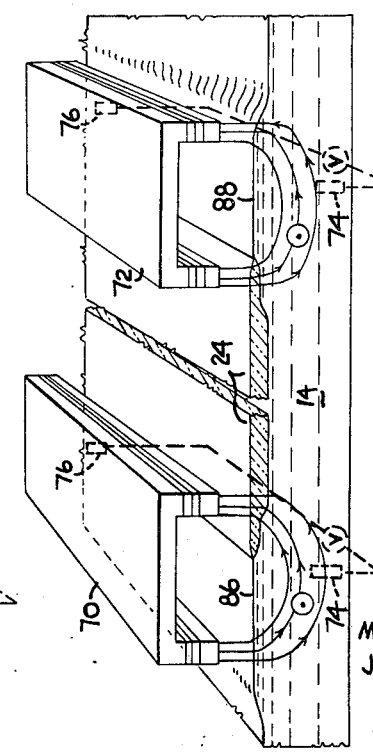

FIGS. 8 and 9 show arrangements similar to those in FIGS. 6 and 7 except that ridges 86 and 88 are formed in the tin at the thickness-forming regions. This is accomplished by reversing the direction of current flow between the electrodes 74 and 76 and thus through the tin.

The depth of the troughs 78 and 80 and the height of the ridges 86 and 88 are determined by the quantity of current flowing through the magnet coils, and the tin, and the spacing of the coils from the tin. Means are provided for varying and controlling these variables, so as to control the thickness of the glass being produced.

Figure 7A:
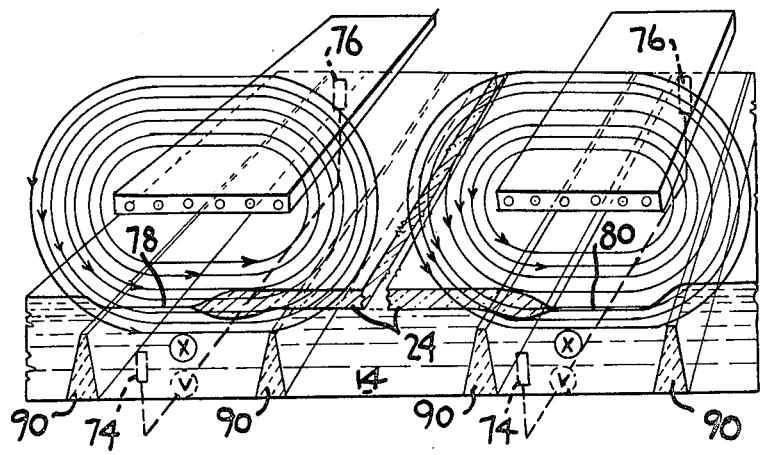
Figure 9A:
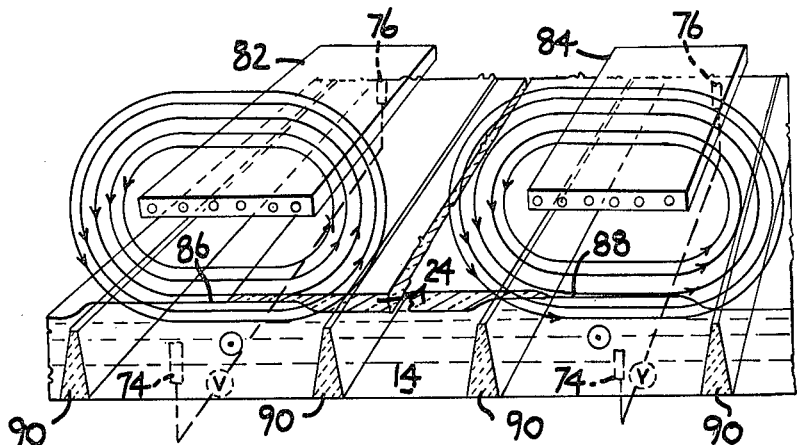

FIGS. 7A and 9A show arrangements similar to that of FIGS. 7 and 9 but differing in the use of current guides 90 extending at least the length of the sizing region of the bath 14 with the upper surfaces spaced just below the surface of the bath 14 and the bottoms on the tank bottom. These guides 90 are constructed of a refractory, electrical insulating material, such as an alumina or silica refractory and are spaced apart a distance corresponding substantially to the width and length of the electrodes 74 and 76. The electrodes 74 and 76 preferably extend only a portion of the length of the bath and to a location where the glass being formed is rigid.

The current guides serve to concentrate electrical current where desired in the bath and eliminates stray electrical currents in the hot tin which may exist or be created because of temperature differentials therein. Less power is required for the process and because of a concentration of power, the forming process becomes more stable. Similar current guides may be used with the embodiments illustrated in FIGS. 6 and 8, if so desired.

SPECIFIC EXAMPLE

A bus bar loop, as depicted in FIGS. 1 to 4 is suspended above a tin bath in a float tank 150 feet in length and a width of 13 feet. The bus bar is positioned over the thickness-forming regions along both edges of the glass ribbon and it extends approximately 50 feet from the inlet to the "zero-growback" location, i.e., that location where the glass is stabilized in thickness and will neither substantially grow nor substantially decrease in thickness or in width. The bus bar loop is three inches wide, 0.55 inch thick with a total periphery of 117 feet. The bus bar is spaced one-half inch from the tin surface prior to being energized. An AC motor generator is connected to the bus bar loop. An equilibrium thickness glass of soda-lime-silica composition is made in the conventional manner, i.e., glass from a melting furnace is discharged onto the tin surface, is permitted to flow laterally unhindered, is permitted to assume smooth surfaces, is cooled to fix its section, and is removed from the bath. The bus bar is energized by applying a current of 1170 amperes thereto. Immediately, troughs are formed in the tin bath below the bus bar and the glass ribbon being formed conforms to the supporting tin surface. Upon cooling, the glass thickness is measured. The edge portions, approximately one and one-half inches wide, at their maximum thickness measure 0.270 inch, i.e., equilibrium thickness, tapering to a knife edge at their termini. The central section of the glass measures one-eighth inch in thickness, slightly less than one-half the equilibrium thickness.

Figure 10:
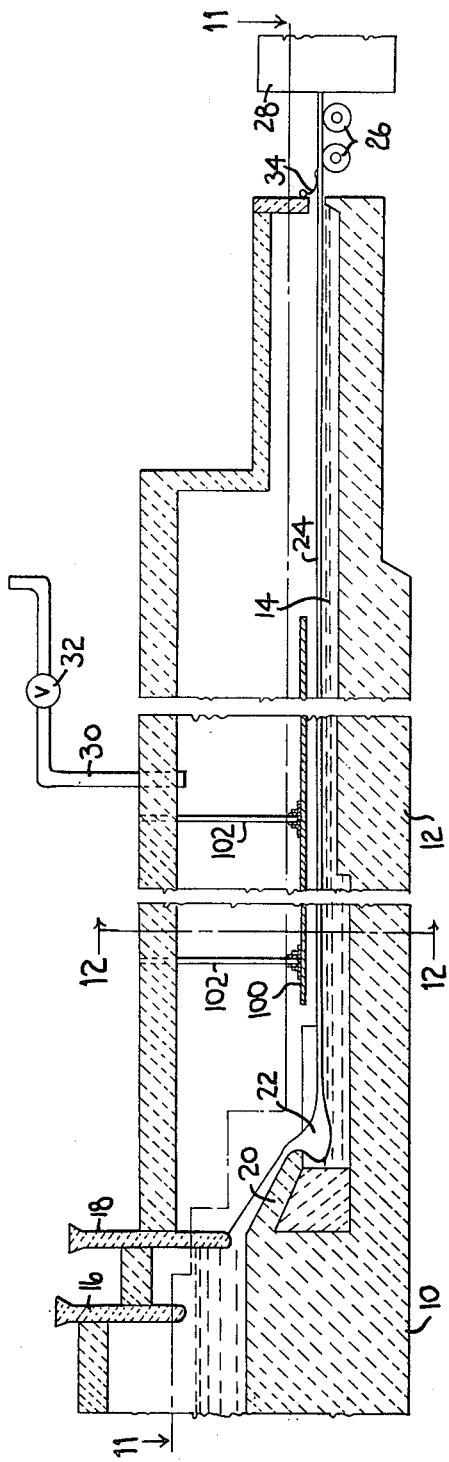
FIG. 10 illustrates, in longitudinal section, a typical float glass-producing apparatus with an electrohydrodynamic system in accordance with this invention installed therein.
Figure 11:
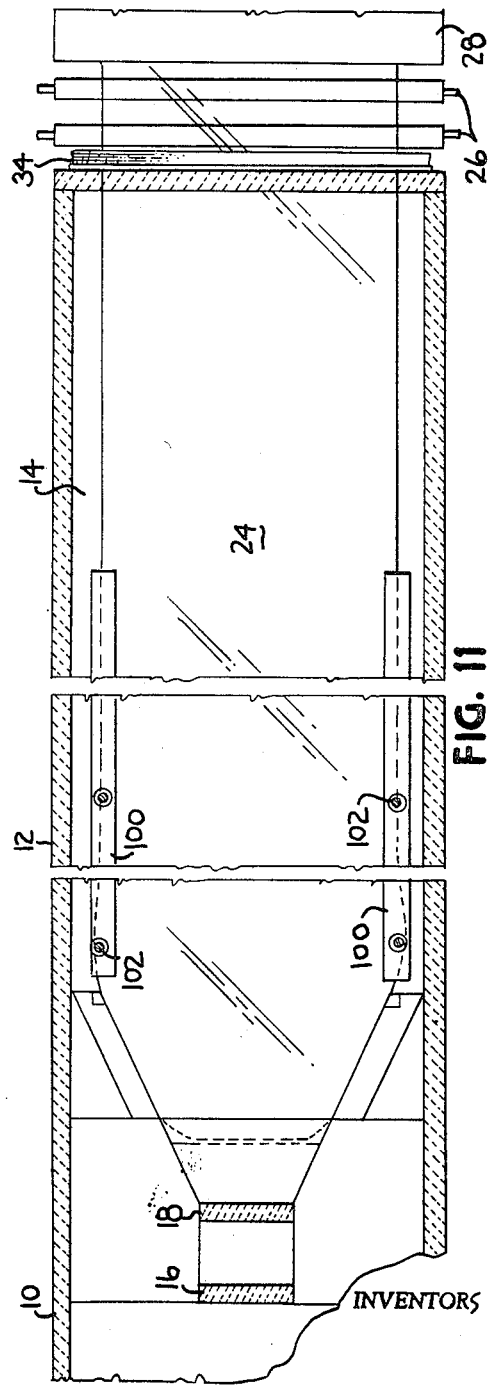
FIG. 11 is a longitudinal section through tthe apparatus of FIG. 10 taken along line 11—11.
Figure 12:
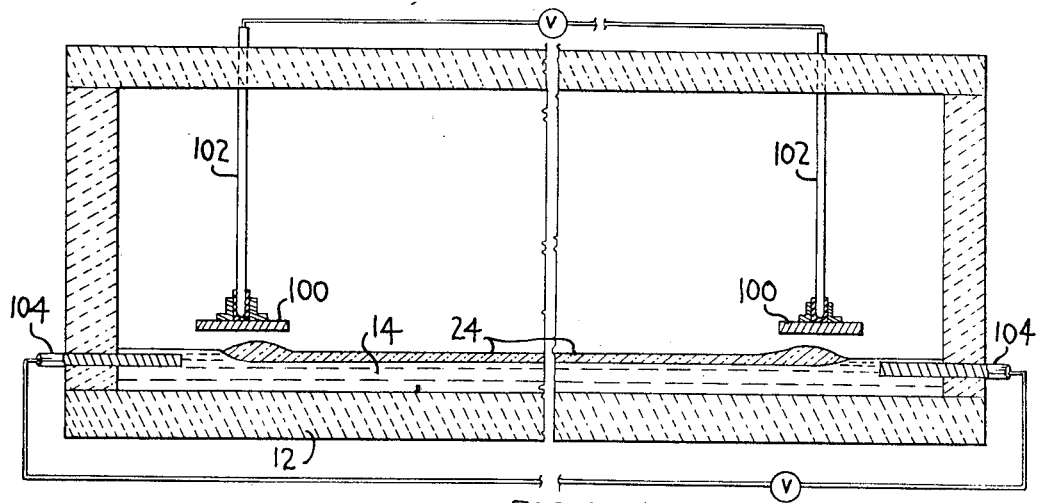
FIG. 12 is a section taken along line 12—12 of FIG. 10.

In FIGS. 10 to 12 there is illustrated an electric field system or electrohydrodynamic glass-forming arrangement for producing thinner than equilibrium glass in the central area of a ribbon of glass. Here, electrodes 100 are suspended by refractory, electrically conducting rods 102 above the bath 14 and immediately above the thickness-forming regions of the bath, i.e., those regions where the edges of the glass are formed. A voltage is applied to the electrodes through the rods 102 and to the glass and tin of the bath through electrodes 104 from a suitable source 106 and bus bars 108. The surfaces of the tin and glass are attracted upwardly and the thickness of that glass in the glass-forming regions, because of surface tension considerations will be substantially as in the equilibrium process. However, the glass in the central portion of the ribbon becomes thinner than equilibrium thickness. Without surface instabilities of the glass and electrical breakdowns, the central portion of the glass can be, by increasing the electric field, reduced to a thickness less than equilibrium thickness. By proper control of the gas pressure in the float tank, electrical breakdown can be avoided and it is theoretically possible to produce nominal one-eighth inch thickness glass.

The electrodes 100 extend along the length of the thickness-forming zone of the tank, i.e., approximately one-third the length of the tank, the glass being at such temperature to be stable in thickness after passing through this zone, i.e., the glass is in a zero grow-back condition. Because of temperatures encountered in the process, on the order of 2000° F., the electrodes 100 are preferably constructed of a suitable refractory metal, as for example, molybdenum sheathed in an alloy, such as Inconel (a high nickel-containing steel alloy). The electrodes are also protected against corrosion by the atmosphere. Inconel itself may be used, however, molybdenum is a better conductor.

Figure 13:
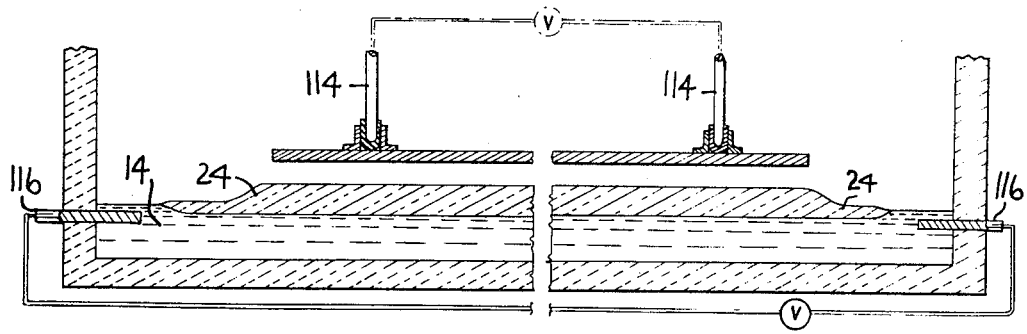
FIG. 13 is a schematic illustration of another form of an electrohydrodynamic system according to the invention.

FIG. 13 illustrates another form of an electrohydrodynamic arrangement for modifying the thickness of glass supported on a molten metal bath in which an electrode 112 is suspended over the central portion of the ribbon of glass and a voltage is then applied to the electrode 112 through its supporting rod 114 and to the tin of the bath through electrodes 116. The thickness-forming region, i.e., the longitudinal edges and edge portions are free to assume the normal, equilibrium configuration. The central portion of the glass is attracted upwardly and by proper control of the applied voltage, glass nominally three-eighths inch thick can be produced.

Figure 14:
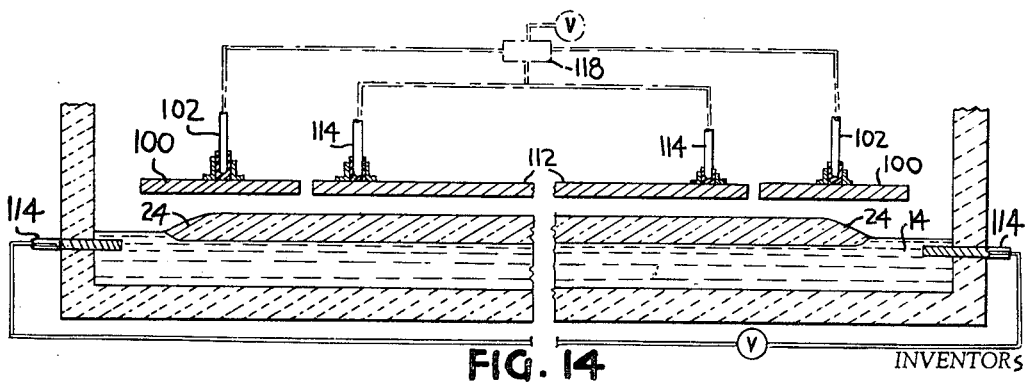
FIG. 14 is a schematic illustration of still another form of the invention which combines the apparatus of FIGS. 10 and 13.

FIG. 14 shows an arrangement combining the apparatus of FIGS. 10 to 12 and FIG. 13, so that depending upon the electrode energized, thick or thin glass, i.e., less than or greater than equilibrium thickness can be produced. Here the electrodes 100 are suspended over the thickness-forming regions while the electrode 112 is suspended over the central area of the ribbon. A selector means 118 is utilized to select the electrode to be energized. In any event, the electrodes 104 are energized to energize the tin of the bath 14.

We claim:
1. In a process of forming a flat glass layer of thickness other than the equilibrium thickness of molten glass material supported on a bath of a molten metal material, the steps which comprise,
   forming a moving layer of glass on said bath,
   advancing the layer lengthwise along the bath,
   establishing an electrically produced force field between a field means and said molten metal bath throughout the lengthwise portion thereof on which said glass is in a formable state,
   said force field extending through at least a portion of said molten glass layer to the molten bath therebelow,
   maintaining said force field sufficient to produce static distortion of a molten metal material subject to said force field so as to modify the thickness of said molten glass layer,
   maintaining such force field until said molten glass layer is in a non-formable state and
   thereafter removing the glass layer from the bath.
2. The process of claim 1 wherein said force field is electromagnetically induced so as to statically distort said molten metal subject thereto magnetohydrodynamically.
3. The process of claim 1 wherein said force field is an alernating current-induced electromagnetic force field.
4. The process of claim 1 wherein said force field is a direct current-induced electromagnetic force field.
5. The process of claim 1 wherein said force field is an electrostatically-induced force field.

6. An apparatus for forming a flat glass layer of thickness other than the equilibrium thickness of molten glass material supported on a bath of molten metal material, which comprises
   means to discharge molten glass material onto said molten metal material and advance said layer therealong,
   field means having at least one element of which overlies in spaced relation a portion of said molten glass material for establishing a force field between said field means and said molten metal material which extends through at least a portion of said molten glass material to the molten bath therebelow,
   means for maintaining the strength of said force field sufficient to produce static distortion of a molten metal material subject to said force field so as to modify the thickness of said molten glass layer material,
   means to cool, thereafter, said molten glass layer and
   means for removing said cooled glass from said molten metal material.
7. An apparatus as recited in claim 6 wherein said field means is an alternating current-induced electromagnetic force field means.
8. An apparatus as recited in claim 6 wherein said field means is a direct current-induced electromagnetic force field means.
9. An apparatus as recited in claim 6 wherein said field means is an electrostatically-induced force field means.
10. An apparatus as recited in claim 6 wherein said field means comprises an electrically energized bus bar overlying a portion of said molten glass material and means to electrically energize said bus bar.
11. An apparatus as recited in claim 10, further including means in said molten metal material to pass an electric current through said molten metal material, said last named means being disposed below said bus bar and substantially coextensive therein.
12. An apparatus as recited in claim 11, further including current guides flanking said means to pass electric current through said molten metal material, said current grades comprising electrically insulating members disposed below the supporting surface of said molten metal material.
13. An apparatus as recited in claim 6 wherein said field means comprises an electromagnetic overlying a portion of said molten glass material and means in said molten metal material to pass an electric current through said molten metal material, said last named means being disposed below said electromagnet and substantially coextensive therewith, and means to energize said electromagnet.
14. An apparatus as recited in claim 6 wherein said field means comprises a capacitor, one plate of which overlies in spaced relation a portion of said molten glass material and the other plate of which comprises the molten metal material, and means to energize said capacitor.

References Cited
UNITED STATES PATENTS 2,198,304  4/1940  Cornelius _____ 65—182 X
3,317,302  5/1967  Mission _____ 65—182 X S. LEON BASHORE, Primary Examiner J. H. HARMAN, Assistant Examiner U.S. Cl. X.R.

65—182

PO-1050
(5/69)

UNITED STATES PATENT OFFICE
CERTIFICATE OF CORRECTION

Patent No. 3,496,736      Dated February 24, 1970

Inventor(s) Mathew Hurwitz and James R. Melcher

It is certified that error appears in the above-identified patent and that said Letters Patent are hereby corrected as shown below:

Column 5, line 30, the word "conduced" is printed as "conducted".

In the list of references, "Mission" should read "Misson".

SIGNED AND
SEALED

SEP 29 1970

(SEAL)
Attest:

Edward M. Fletcher, Jr.
Attesting Officer

WILLIAM E. SCHUYLER, JR.
Commissioner of Patents